US012776832B2

(12) United States Patent
Billman et al.

(10) Patent No.: US 12,776,832 B2
(45) Date of Patent: Oct. 27, 2026

(54) SATELLITE COMMUNICATIONS NETWORK, SATELLITE TERMINAL AND OPERATION METHOD

(71) Applicant: All.Space Networks Limited, Reading (GB)

(72) Inventors: Brian Murphy Billman, Baltimore, MD (US); Jeremiah P. Turpin, Linthicum, MD (US); John Finney, London (GB)

(73) Assignee: All.Space Networks Limited, Reading (GB)

( * ) Notice: Subject to any disclaimer, the term of this patent is extended or adjusted under 35 U.S.C. 154(b) by 374 days.

(21) Appl. No.: 18/120,372

(22) Filed: Mar. 11, 2023

(65) Prior Publication Data

US 2023/0291469 A1 Sep. 14, 2023

Related U.S. Application Data

(60) Provisional application No. 63/318,975, filed on Mar. 11, 2022.

(51) Int. Cl.
*H04B 7/185* (2006.01)

(52) U.S. Cl.
CPC ....... *H04B 7/1856* (2013.01); *H04B 7/18547* (2013.01); *H04B 7/18563* (2013.01)

(58) Field of Classification Search
CPC ............ H04B 7/18517; H04B 7/18523; H04B 7/18539; H04B 7/18547; H04B 7/18556; H04B 7/1856; H04B 7/18563
(Continued)

(56) References Cited

U.S. PATENT DOCUMENTS 4,332,018 A 5/1982 Sternberg et al.
4,845,507 A 7/1989 Archer et al.
(Continued)

FOREIGN PATENT DOCUMENTS

EP 1 085 599 A2 3/2001
EP 1 690 107 A2 8/2006
(Continued)

OTHER PUBLICATIONS

International Search Report and Written Opinion mailed Aug. 29, 2023 in connection with International Application No. PCT/GB2023/050579.
(Continued)

*Primary Examiner* — Robert J Lopata
(74) *Attorney, Agent, or Firm* — Wolf, Greenfield & Sacks, P.C.

(57) ABSTRACT

A method of operating a satellite communications network, the method comprising: receiving from a satellite terminal a message; and storing the message contents in a satellite network database, the message indicating one or both of: (i) a list of communication satellites which are blocked to a satellite antenna or a portion of the field of view of the satellite antenna which is blocked, at a particular geographic location of the satellite antenna; and (ii) a list of communication satellites that are visible to the satellite antenna or a visible portion of the field of view of the satellite antenna, at a particular geographic location of the satellite antenna. A method of operating a satellite terminal having a satellite antenna. The method comprises controlling a beam of the satellite antenna to scan at least a portion of the field of view of the satellite antenna and locate at least one communication satellite or controlling a beam of the satellite antenna to perform a search to locate a communication satellite in the vicinity of a predicted location of the communication sat-
(Continued)

ellite, the predicted location being obtained from satellite ephemeris data. The method further comprises updating a satellite terminal database of communication satellites and their locations by recording the location of the located communication satellite in the satellite terminal database. The database and satellite ephemeris data may be used to determine a list of communication satellites which are blocked or a portion of the field of view of the satellite antenna which is blocked at the current location of the satellite antenna, or to determine a list of communication satellites that are visible to the satellite antenna or a visible portion of the field of view of the satellite antenna. The blocking information or visibility information may be transmitted to a satellite communication network and may be used to build a model of satellite communications network availability across a geographical area.

33 Claims, 7 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 5,283,587 | A | 2/1994 | Hirshfield et al. | |
| 5,436,453 | A | 7/1995 | Chang et al. | |
| 5,457,465 | A | 10/1995 | Collier et al. | |
| 5,821,908 | A | 10/1998 | Sreenivas | |
| 5,936,570 | A * | 8/1999 | Ghazvinian | H04B 7/2125 342/359 |
| 6,133,887 | A | 10/2000 | Tanizaki et al. | |
| 7,193,560 | B2 | 3/2007 | Dooley et al. | |
| 7,345,652 | B2 | 3/2008 | Schaffner et al. | |
| 7,417,597 | B1 | 8/2008 | Lopez | |
| 7,642,957 | B2 | 1/2010 | Lennen et al. | |
| 7,683,830 | B2 | 3/2010 | Montgomery et al. | |
| 7,760,136 | B2 | 7/2010 | Lawrence | |
| 7,786,933 | B2 | 8/2010 | Chang | |
| 7,859,461 | B2 | 12/2010 | Wengler et al. | |
| 8,035,562 | B2 | 10/2011 | Chang | |
| 8,044,847 | B1 | 10/2011 | Kling et al. | |
| 8,044,857 | B2 | 10/2011 | Maenpa et al. | |
| 8,089,402 | B2 | 1/2012 | Maenpa et al. | |
| 8,125,384 | B1 | 2/2012 | Kling et al. | |
| 8,154,445 | B2 | 4/2012 | Maenpa et al. | |
| 8,232,918 | B2 | 7/2012 | Ohang | |
| 8,583,315 | B2 | 11/2013 | Whitehead et al. | |
| 8,665,152 | B1 | 3/2014 | Kling et al. | |
| 8,674,874 | B2 | 3/2014 | Soualle et al. | |
| 8,736,490 | B2 | 5/2014 | Simic et al. | |
| 8,896,479 | B2 | 11/2014 | Wang et al. | |
| 9,110,161 | B2 | 8/2015 | Waters et al. | |
| 9,172,402 | B2 | 10/2015 | Gudem et al. | |
| 9,356,358 | B2 | 5/2016 | Chang et al. | |
| 9,435,893 | B2 | 9/2016 | Chang | |
| 9,612,337 | B2 | 4/2017 | Floch | |
| 9,612,342 | B2 | 4/2017 | Petersen | |
| 9,651,666 | B2 | 5/2017 | Brekke | |
| 9,671,499 | B2 | 6/2017 | Liu et al. | |
| 9,689,989 | B2 | 6/2017 | Trautenberg et al. | |
| 9,726,764 | B1 | 8/2017 | Heinrich | |
| 9,766,341 | B2 | 9/2017 | Chamseddine | |
| 9,778,367 | B2 | 10/2017 | Wang et al. | |
| 9,778,368 | B2 | 10/2017 | Krantz et al. | |
| 9,927,527 | B2 | 3/2018 | Weger et al. | |
| 10,006,051 | B2 | 6/2018 | Boeke et al. | |
| 10,020,875 | B2 | 7/2018 | Agarwal | |
| 10,031,234 | B1 | 7/2018 | Alexander | |
| 10,031,238 | B2 | 7/2018 | Navsariwala et al. | |
| 10,054,687 | B2 | 8/2018 | Whitehead | |
| 10,116,051 | B2 | 10/2018 | Scarborough et al. | |
| 10,193,231 | B2 | 1/2019 | Wallace et al. | |
| 10,256,537 | B2 | 4/2019 | Besoli et al. | |
| 10,288,742 | B2 | 5/2019 | Dickman et al. | |
| 10,553,947 | B2 | 2/2020 | Scarborough et al. | |
| 11,550,062 | B2 | 1/2023 | Zavrel et al. | |
| 11,848,746 | B1 * | 12/2023 | Wang | H04B 7/18539 |
| 2008/0238795 | A1 | 10/2008 | Alamouti et al. | |
| 2012/0286992 | A1 | 11/2012 | Tekin et al. | |
| 2012/0286994 | A1 | 11/2012 | Letestu et al. | |
| 2013/0214967 | A1 * | 8/2013 | Shin | G01S 19/34 342/357.3 |
| 2014/0035783 | A1 | 2/2014 | Contarino et al. | |
| 2014/0247186 | A1 | 9/2014 | Daneshmand et al. | |
| 2015/0130678 | A1 | 5/2015 | Lee et al. | |
| 2015/0346345 | A1 | 12/2015 | Bartone | |
| 2016/0006129 | A1 | 1/2016 | Haziza | |
| 2016/0033648 | A1 | 2/2016 | Overbeck | |
| 2016/0170029 | A1 * | 6/2016 | Wyler | H01Q 3/36 342/354 |
| 2016/0240923 | A1 | 8/2016 | Oh | |
| 2017/0033458 | A1 | 2/2017 | Haziza | |
| 2017/0040705 | A1 | 2/2017 | Matitsine et al. | |
| 2017/0040706 | A1 | 2/2017 | Matitsine et al. | |
| 2017/0062944 | A1 | 3/2017 | Zimmerman et al. | |
| 2018/0115977 | A1 | 4/2018 | Fujita | |
| 2018/0175507 | A1 | 6/2018 | Diaz | |
| 2018/0183152 | A1 | 6/2018 | Turpin | |
| 2018/0239028 | A1 | 8/2018 | Ibendorf et al. | |
| 2018/0269576 | A1 | 9/2018 | Scarborough et al. | |
| 2018/0288627 | A1 | 10/2018 | Ellum et al. | |
| 2018/0299560 | A1 | 10/2018 | Zangvil et al. | |
| 2019/0074588 | A1 | 3/2019 | Scarborough et al. | |
| 2019/0204451 | A1 | 7/2019 | Boyer et al. | |
| 2020/0144719 | A1 | 5/2020 | Scarborough et al. | |
| 2020/0278452 | A1 * | 9/2020 | Kennedy | G01S 19/07 |
| 2020/0278453 | A1 * | 9/2020 | Levy | G01S 19/37 |
| 2021/0208284 | A1 | 7/2021 | Zavrel et al. | |
| 2021/0400462 | A1 | 12/2021 | Huang et al. | |
| 2022/0046517 | A1 | 2/2022 | Dang et al. | |
| 2022/0376777 | A1 * | 11/2022 | Bode | H04B 7/18547 |
| 2023/0199694 | A1 * | 6/2023 | Ghanbarinejad | H04B 7/18556 455/456.2 |
| 2023/0269635 | A1 * | 8/2023 | Xu | H04W 48/20 370/329 |
| 2023/0276323 | A1 * | 8/2023 | Li | H04W 36/08 370/331 |
| 2023/0413141 | A1 * | 12/2023 | Määttänen | H04W 36/0061 |
| 2024/0094405 | A1 * | 3/2024 | Buer | H04B 7/18517 |
| 2024/0114423 | A1 * | 4/2024 | Mukae | B64G 1/1028 |
| 2024/0154652 | A1 * | 5/2024 | McCormick | H04W 16/28 |
| 2024/0365187 | A1 * | 10/2024 | Liang | H04W 36/0058 |
| 2025/0048128 | A1 * | 2/2025 | McCormick | G01S 3/56 |

FOREIGN PATENT DOCUMENTS

| | | | |
|---|---|---|---|
| EP | 2 367 026 | A1 | 9/2011 |
| EP | 2 589 983 | A1 | 5/2013 |
| EP | 3 026 462 | A1 | 6/2016 |
| JP | H09-8534 | A | 1/1997 |
| JP | 2000-022423 | A | 1/2000 |
| JP | 2000-196345 | A | 7/2000 |
| WO | WO 99/62137 | A1 | 12/1999 |
| WO | WO 2005-057808 | A2 | 6/2005 |
| WO | WO 2014/046538 | A1 | 3/2014 |
| WO | WO 2018/048520 | A1 | 3/2018 |
| WO | WO 2018/132511 | A1 | 7/2018 |
| WO | WO 2018/211356 | A1 | 11/2018 |

OTHER PUBLICATIONS

Extended European Search Report dated Apr. 20, 2018 in connection with European Application No. 17196795.3.

International Search Report & Written Opinion mailed May 3, 2018 in connection with International Application No. PCT/IB2018/051752.

(56) References Cited

OTHER PUBLICATIONS

International Search Report & Written Opinion mailed Dec. 17, 2019 in connection with International Application No. PCT/IB2019/057947.

International Search Report and Written Opinion mailed Mar. 15, 2021 in connection with International Application No. PCT/IB2020/062250.

International Preliminary Report on Patentability mailed Jul. 7, 2022 in connection with International Application No. PCT/IB2020/062250.

Japanese Office Action for JP Application No. 2017-233638 dated Jan. 29, 2019.

Russia Office Action for RU Application No. 2019126577/28(052105) dated Feb. 2, 2022.

[No Author Listed], Side lobe. Wikipedia. Apr. 2008. https://en.wikipedia.org/wiki/Sidelobes [last edited Aug. 12, 2022]. 3 pages.

[No Author Listed], Phased array. Wikipedia. Apr. 17, 2017. https://en.wikipedia.org/wiki/Phased_array. 11 pages.

Cuntz et al., A Multi Antenna Receiver for Galllep SoL Applications. IEEE MTT-S International Mini-Symposium on Electromagnetics and Network Theory and their Microwave Technology Applications, Oct. 9, 2008, 7 pgs.

De Lorenzo et al., Testing of Adaptive Beamsteering for Interference Rejection in GNSS Receivers. Proc. ENC, 2007, pp. 1277-1287.

Elsherbiny et al., Holographic Antenna Concept, Analysis, and Parameters. IEEE Transactions on Antennas and Propagation, vol. 52. No. 3, Mar. 2004, p. 830-839.

Kumar et al., A Wide Band Antenna for Multi-Constellation GNSS and Augmentation System. Progress in Electromagnetics Research M, vol. 11, 2010, pp. 65-77.

Li et al., Beam Scanning Array Based on Luneburg Lens. IEEE, 2014, p. 1274-5.

Li et al., Luneburg Lens with Extended Flat Focal Surface for Electronic Scan Applications. Optics Express, vol. 24, No. 7, Mar. 25, 2016; 11 pages.

Gregory et al., Exploiting Rotational Symmetry for the Design of Ultra-Wideband Planar Phased Array Layouts. IEEE Transactions on Antennas and Propagation, vol. 61, No. 1, Jan. 2013, pp. 176-184.

Mateo-Segura et al., Flat Luneburg Lens via Transformation Optics for Directive Antenna Applications. IEEE Transactions on Antennas and Propagation, vol. 62, No. 4, Apr. 2014, pp. 1945-1953.

Napier et al., The Very Large Array: Design and Performance of a Modern Synthesis Radio Telescope. Proceedings of the IEEE, vol. 71, No. 11, Nov. 1983, 31 pages.

Vagle et al., Performance analysis of GNSS multipath mitigation using antenna arrays. The Journal of Global Positioning Systems. Dec. 2016., 14(1):4, 15 pages.

Vo H, Development of an Ultra-Wideband Low-Profile Wide Scan Angle Phased Array Antenna. Dissertation. Ohio State University, 2015, 112 pages.

Wang, Antennas for Global Navigation Satellite System (GNSS). Proceedings of the IEEE, vol. 100, No. 7, Jul. 2012, pp. 2349-2355.

* cited by examiner

SATELLITE COMMUNICATIONS NETWORK, SATELLITE TERMINAL AND OPERATION METHOD

CROSS-REFERENCE TO RELATED APPLICATIONS

This application claims the benefit under 35 U.S.C. § 119 (e) of U.S. Provisional Patent Application Ser. No. 63/318,975, filed Mar. 11, 2022 and entitled, "SATELLITE TERMINAL AND OPERATION METHOD," which is hereby incorporated herein by reference in its entirety.

TECHNICAL FIELD

The present disclosure relates to a method of operating a satellite terminal and a satellite terminal configured to implement the method. Further aspects relate to a method of operating a satellite communications network, a corresponding satellite communications network entity configured to implement the method and a satellite communications system comprising the aforementioned satellite communication network and the aforementioned satellite communications network entity, and a computer-readable storage medium having stored thereon a computer-readable program code to cause a processor to perform the method of operating a satellite terminal or the method of operating a satellite communications network.

BACKGROUND

Satellite communication is a long-established technique permitting a terrestrial satellite terminal (which may be located on the ground or airborne) to connect to or communicate with another network location via a communication satellite. Messages may be relayed by a communication satellite to and/or from a satellite terminal. That is, the communication path may be unidirectional, for instance to the satellite terminal in the case of broadcast television. Or the communication path may be bi-directional, and hence support a broad range of services by the satellite terminal being configured to exchange messages with communication satellite.

Conventionally, communication between a satellite terminal and a satellite communications network is controlled primarily or wholly from the network side: the communication satellite or satellites, together with terrestrial infrastructure. Routing decisions concerning which communication satellite a satellite terminal should connect to, or handover to in the event of one or both of the communication satellite and the satellite terminal being in motion, typically fall within the remit of the network. Additionally, conventional satellite networks typically have minimal understanding of the reasons for a failed connection to a satellite terminal, and therefore are required to make routing decisions based solely on factors within their control (for instance, relative traffic loading on each communication satellite in the constellation).

BRIEF SUMMARY OF THE DISCLOSURE

According to a first aspect there is provided a method of operating a satellite communications network, the method comprising: receiving from a satellite terminal a message; and storing the message contents in a satellite network database, the message indicating one or both of: (i) a list of communication satellites which are blocked to a satellite antenna or a portion of the field of view of the satellite antenna which is blocked, at a particular geographic location of the satellite antenna; and (ii) a list of communication satellites that are visible to the satellite antenna or a visible portion of the field of view of the satellite antenna, at a particular geographic location of the satellite antenna.

According to a second aspect there is provided a method of operating a satellite terminal having a satellite antenna, the method comprising: controlling a beam of the satellite antenna to scan at least a portion of the field of view of the satellite antenna and locate at least one communication satellite; or controlling a beam of the satellite antenna to perform a search to locate a communication satellite in the vicinity of a predicted location of the communication satellite, the predicted location being obtained from satellite ephemeris data; the method further comprising updating a satellite terminal database of communication satellites and their locations by recording the location of the located communication satellite in the satellite terminal database.

According to a third aspect there is provided a computer-readable storage medium having computer-readable program code stored therein that, in response to execution by a processor, cause the processor to perform either of the above methods.

According to a fourth aspect there is provided a satellite terminal comprising: a satellite antenna; a processor; and a memory storing executable instructions that, in response to execution by the processor, cause the processor to perform the method of the first aspect.

According to a fifth aspect there is provided a satellite communications network element (satellite communications network entity) comprising: a transceiver; a processor; and a memory storing executable instructions that, in response to execution by the processor, cause the processor to perform the method of the second aspect.

According to a sixth aspect there is provided a satellite communications system comprising; a satellite terminal according to the fourth aspect; and a network element (network entity) according to the fifth aspect.

According to certain examples, a satellite terminal is configured to scan the sky within the field of view of a satellite antenna in order to locate (e.g. to identify) available communication satellites. This may be referred to as "sky mapping". Those available satellites may be used to select a communication satellite with more advantageous properties (for instance, signal strength, estimated throughput, latency, etc.) than a first communication satellite with which the satellite terminal is currently communicating. Or the identified available satellite data may be used to inform future routing decisions either within the satellite terminal or at a satellite communication network entity (if the available satellite information is fed back to the network).

A further advantage of certain examples is that a determination may be made for communication satellites of a portion of the antenna field of view that is blocked (or visible) at the current location of the satellite terminal, enabling again improved routing decisions such as avoiding an attempt to handover to a blocked satellite (or a satellite on a trajectory that will cause it soon to become blocked). A model of satellite availability and blocking (or visibility) across a geographic area may be built up using data received from a mobile satellite terminal (and also from further satellite terminals). This model may be used in particular for routing determinations made by the network, including for satellite terminals that do not themselves have the capability to determine if a portion of the field of view is blocked (or visible).

Methods of operating a satellite terminal in accordance with examples of the present disclosure are not restricted to any particular hardware implementation. However, in some examples, advantageously a multiple beam antenna permits sky mapping to be performed in parallel to an ongoing satellite communication link. Additionally, or alternatively, multiple beams may be deployed in tandem to speed the process of sky mapping.

Another aspect provides a computer program comprising instructions arranged, when executed, to implement a method in accordance with any one of the above-described aspects. A further aspect provides machine-readable storage storing such a program.

Another aspect provides a method of operating a satellite terminal having a satellite antenna, the method comprising generating at least two beams simultaneously or in separate time periods on a time slicing basis, the at least two beams comprising: a communication beam providing a communication link with a communication satellite; and a search beam scanning at least a portion of the field of view of the satellite antenna to identify one or more of: communication satellites which are blocked at different satellite antenna locations; portions of the field of view of a satellite antenna which are blocked at different satellite antenna locations; communication satellites which are visible at different satellite antenna locations; and visible portions of the field of view of a satellite antenna at different satellite antenna locations.

The step of controlling the beam of the satellite antenna may comprise producing a broader first beam for performing an initial search, and then when a communication satellite is detected, producing a narrower second beam for performing a second search.

The method may further comprise using information received from satellite terminals to build a model of satellite communications network availability across a geographical area, the information indicating one or more of: communication satellites which are blocked at different satellite antenna locations; portions of the field of view of a satellite antenna which are blocked at different satellite antenna locations; communication satellites which are visible at different satellite antenna locations; and visible portions of the field of view of a satellite antenna at different satellite antenna locations.

The method may further comprise determining the information by at least one of the satellite terminals generating at least two beams simultaneously or in separate time periods on a time slicing basis, the at least two beams comprising: a communication beam providing a communication link with a communication satellite; and a search beam for identifying the one or more of: communication satellites which are blocked at different satellite antenna locations; portions of the field of view of a satellite antenna which are blocked at different satellite antenna locations; communication satellites which are visible at different satellite antenna locations; and visible portions of the field of view of a satellite antenna at different satellite antenna locations.

The method may comprise controlling the search beam to scan at least a portion of the field of view of a satellite antenna of the satellite terminal.

The method may further comprise using the model to select a communications satellite for communication with a satellite terminal according to a known location of the satellite antenna of that satellite terminal.

The method may further comprise: receiving from a satellite terminal a message including, for a geographic location of the satellite antenna, information characterising at least one communication satellite, the information including at least one of: a location of the communication satellite; an identity of the communication satellite; a signal strength; a latency estimate; a link reliability estimate; a network congestion estimate; a bandwidth availability estimate; a link frequency measurement; an interference signal; and storing the characterising information in the satellite network database.

The method may further comprise: communicating with a satellite terminal via a first communication satellite in the network; receiving from the satellite terminal a message requesting handover to an alternative communication satellite or a message indicating a portion of the field of view of a satellite antenna of the satellite terminal which is blocked at a current location of the satellite antenna; and instructing a handover of communications from the first communication satellite to a second communication satellite on the basis of the received message and the contents of the satellite network database.

The method may further comprise: extracting, from satellite ephemeris data, information indicating how secure or trusted a communication satellite is, and storing this information in the satellite terminal database as information characterising a located communication satellite.

The method may further comprise: determining at least one of a location of the satellite antenna and an orientation of the satellite antenna at the time of locating a communication satellite; and recording the current location of the satellite antenna or the orientation of the satellite antenna in the satellite terminal database in association with the location of the communication satellite.

The step of controlling a beam of the satellite antenna to perform a search to locate a communication satellite in the vicinity of a predicted location of the communication satellite may further comprise: determining from the satellite ephemeris data a predicted location for a first communication satellite for a current location or orientation of the satellite antenna.

The method may further comprise: controlling a beam of the satellite antenna to scan at least a portion of the field of view of the satellite antenna to locate communication satellites in addition to using the predicted location of the first communication satellite.

The method may further comprise: comparing predicted locations of communication satellites from the satellite ephemeris data for a current location of the satellite antenna and locations of communication satellites in the satellite terminal database; and determining based on the comparison at least one of: a list of communication satellites which are blocked at the current location of the satellite antenna; and a portion of the field of view of the satellite antenna which is blocked at the current location of the satellite antenna.

The method may further comprise transmitting a message to a satellite communication network or to a further satellite terminal, the message indicating a list of communication satellites which are blocked or a portion of the field of view of the satellite antenna which is blocked at a particular geographic location of the satellite antenna; or updating the satellite terminal database with a list of communication satellites which are blocked or a portion of the field of view of the satellite antenna which is blocked at a particular geographic location of the satellite antenna.

The method may further comprise: comparing predicted locations of communication satellites from the satellite ephemeris data for a current location of the satellite antenna and locations of communication satellites in the satellite terminal database; and determining based on the comparison at least one of: a list of communication satellites that are visible at the current location of the satellite antenna; and a portion of the field of view of the satellite antenna that is visible at the current location of the satellite antenna.

The method may further comprise transmitting a message to a satellite communication network or to a further satellite terminal, the message indicating a list of communication satellites which are visible or a portion of the field of view of the satellite antenna which is visible at a particular geographic location of the satellite antenna; or updating the satellite terminal database with a list of communication satellites which are visible or a portion of the field of view of the satellite antenna which is visible at a particular geographic location of the satellite antenna.

The method may further comprise: controlling a beam of the satellite antenna to perform a search based on a location of a first communication satellite in the satellite terminal database; determining an updated location for the first communication satellite; and updating the location of the first communication satellite in the satellite terminal database.

The method may further comprise: estimating a trajectory of a communication satellite based on locations of the communication satellite at first and second time points; and using the estimated trajectory to predict a location of the communication satellite at a third time point.

The method may further comprise: receiving a signal from a communication satellite through a beam of the satellite antenna; performing at least one of: identifying the communication satellite using the received signal; determining a signal strength for the communication satellite using the received signal; and determining a signal latency for the communication satellite using the received signal; and updating the satellite terminal database with information characterising the communication satellite, the information comprising at least one of: the identity of the communication satellite; the signal strength of the received signal; and the signal latency of the received signal.

The determination of signal latency for the communication satellite may be based on timing information contained within the received signal, or timing information contained within the received signal combined with satellite ephemeris data.

The method may further comprise: determining an estimate of uplink or downlink bandwidth throughput for a communication satellite based on measured signal strength and information in the satellite ephemeris data concerning orbit or type of satellite; and storing the estimated uplink or downlink bandwidth in the satellite terminal database as information characterising the communication satellite.

The method may further comprise: controlling a beam of the satellite antenna to detect an interference signal that could interfere with communication between the satellite antenna and a communication satellite in the satellite terminal database; and updating the satellite terminal database with information about the interference signal.

The method may further comprise: determining a received direction for an interference signal for two or more locations of the satellite antenna; determining the location of the interference source; and updating the satellite terminal database with the location of the interference signal.

The method may further comprise: controlling the satellite antenna to generate a beam to communicate with a first communication satellite; determining to connect to an alternative communication satellite on the basis of one of: information characterising the first communication satellite; information in the satellite terminal database characterising an alternative communication satellite, a satellite that is blocked to the satellite antenna, a blocked portion of the field of view of the satellite antenna, a communication satellite that is visible to the satellite antenna, or a visible portion of the field of view of the satellite antenna; and a change in type of communication traffic to be transmitted to a satellite communication network; selecting a second communication satellite from a plurality of communication satellites recorded in the satellite terminal database on the basis of information in the satellite terminal database characterising the communication satellites; and controlling the satellite antenna to generate a beam to communicate with the second communication satellite.

The method may further comprise: controlling the satellite antenna to generate a beam to communicate with a first communication satellite; and receiving from the first communication satellite a signal instructing a handover of communications from the first communication satellite to a second communication satellite; wherein the method further comprises: identifying a current location for the second communication satellite using the satellite terminal database and using the current location for the second communication satellite to steer a beam of the satellite antenna to the current location for the second communication satellite; or transmitting a message to the first communication satellite requesting handover instead to an alternative communication satellite in the satellite terminal database.

The method may further comprise: controlling the satellite antenna to generate a beam to communicate with a first communication satellite; determining to connect to an alternative communication satellite on the basis of one of: information characterising the first communication satellite; information in the satellite terminal database characterising an alternative communication satellite; and a change in type of communication traffic to be transmitted to a satellite communication network; and transmitting a message to a satellite communication network requesting a handover to an alternative communication satellite recorded in the satellite terminal database.

The method may further comprise transmitting a message to a satellite communication network or to a further satellite terminal, the message including at least part of the contents of the satellite terminal database.

The satellite antenna may be a multiple beam satellite antenna configured to generate at least two beams simultaneously; or the satellite antenna may be configured to generate at least two beams in separate time periods.

The satellite antenna may be one of: a VSAT antenna; a phased array; and a lens antenna array.

The lens antenna array may comprise: a plurality of lens sets, each lens set including: a lens; and plurality of feed elements aligned with the lens and each configured to direct a signal through the lens in different desired directions; wherein controlling the feed elements for the plurality of lens sets enables the control of at least two separate beams.

BRIEF DESCRIPTION OF THE DRAWINGS

Examples of the invention are further described hereinafter with reference to the accompanying drawings, in which.

DETAILED DESCRIPTION

It is an aim of certain examples to solve, mitigate or obviate, at least partly, at least one of the problems and/or disadvantages associated with the prior art. Certain examples aim to provide at least one of the advantages described herein. In particular, certain examples seek to provide a satellite communications system that is more robust and flexible by making better use of information concerning the prevailing conditions at terrestrial satellite terminal locations.

A method of method for building a satellite blockage model is disclosed, in which one or more active communications beams can be maintained whilst one or more search beams can be used to build a blockage model (enabling assessment of whether communication satellites or a portion of the field of view of the antenna (or both) is blocked or visible), without dropping the active communications beam. The method enhances communications resilience and reliability by reducing the risk of unexpected failures of a communications link when only an active communications beam is operated and responds reactively. By the satellite terminal sharing its blockage model, the reliability of other satellite terminals, and the overall network, is enhanced.

A method to searching for satellites is disclosed, which enables more rapid location of a satellite, where a location is not already known or accurate, for example where the accuracy of ephemeris data cannot be relied upon. One or more active communications beams can be maintained whilst one or more search beams can be used to search for satellites. The method of searching enables improved situational awareness by identifying satellites or other signal sources that have not otherwise been known.

Figure 1:
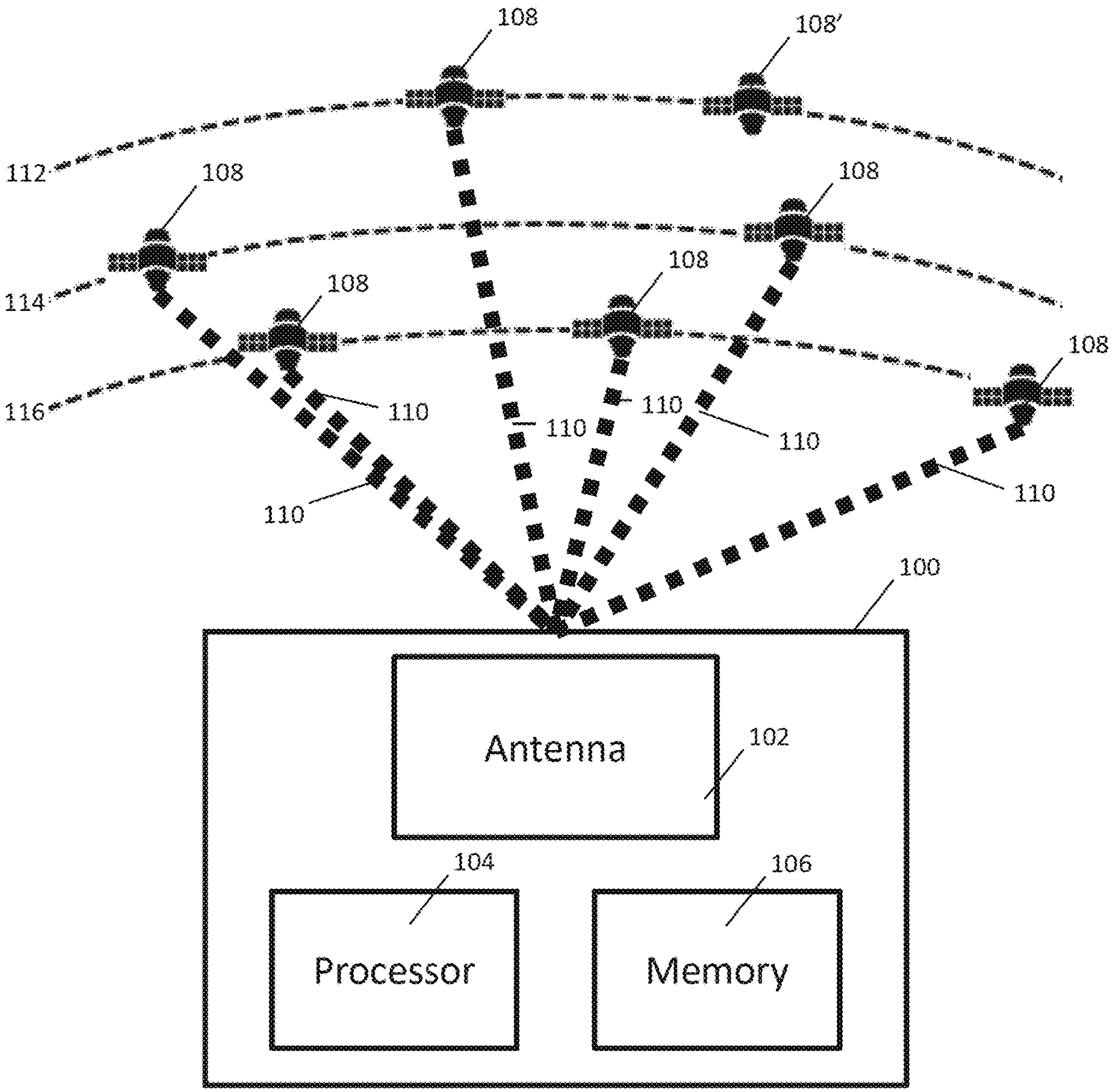
FIG. 1 is a schematic illustration of a satellite terminal operating in accordance with an example of the present disclosure.
Figure 2:
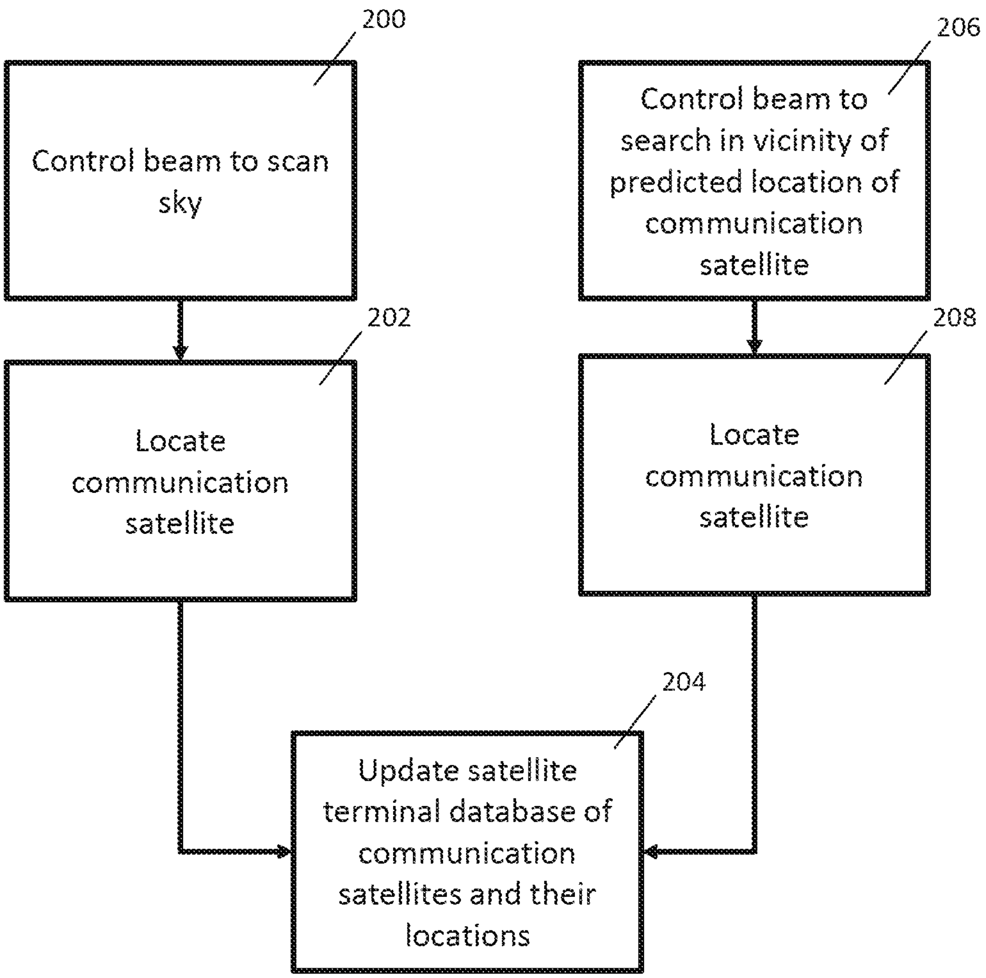
FIG. 2 is a flowchart illustrating a method of operating a satellite terminal in accordance with an example of the present disclosure.

In accordance with an example of the present disclosure there is provided a satellite terminal (satellite communication terminal) 100 as illustrated in FIG. 1 and a method of operating the satellite terminal 100 as illustrated in the flowchart of FIG. 2. The satellite terminal 100 is operable to locate communication satellites and store information concerning those communication satellites in a satellite terminal database. Locating communication satellites may include identifying the communication satellites. The located communication satellites may be described as available communication satellites in the sense that they are visible to the satellite terminal 100 and hence in principle are available for the satellite terminal to communicate with. However, it will be appreciated that many other factors dictate whether a satellite terminal 100 is able to communicate with a communication satellite, including for instance whether there is a commercial relationship between the operator of the satellite terminal 100 and an operator of the communication satellite. A communication satellite may have a shaped beam that extends across only part of the field of view of the antenna of the communication satellite, such as a pattern of narrow beams ("spot beams"), and another factor that may dictate whether a satellite terminal 100 is able to communicate with a communication satellite within the field of view of the satellite antenna 102 of the satellite terminal is whether the beam of the communication satellite extends across the geographical location of the satellite antenna.

As is described below, in certain examples of the present disclosure the satellite terminal 100 may communicate information from the satellite terminal database, such as the locations of communication satellites (alternatively or additionally, the identities of communication satellites), to a satellite communications network element (ground based or a satellite itself) in order to inform decisions such as network routing made by the network controller. Where network routing decisions are made by the network controller, those decisions may be based upon information concerning the locations (or identities) of communication satellites gathered from satellite terminals 100 with satellite antenna 102 at different geographical locations. Alternatively, the satellite terminal 100 may independently make use of the information within the satellite terminal database. Where network routing decisions are made by the satellite terminal 100, those decisions may be based upon information concerning the locations (or identities) of communication satellites in different networks.

Satellite terminal 100 comprises a satellite antenna 102, a processor 104 and a memory 106. The memory 106 is configured to store instructions that, in response to execution by the processor 104, cause the processor 104 to control the whole satellite terminal 100 in accordance with examples of the present disclosure. In particular, the processor 104 controls the satellite antenna 102 to generate at least one beam (at least one search beam) that is operable to search for and to receive signals from communication satellites 108. The present disclosure is not restricted to any specific hardware implementation of a satellite terminal 100, or any particular satellite antenna 102, beyond the requirement for the satellite antenna 102 to be operable to generate at least one beam for receiving a signal from (and in some examples, transmitting a signal to) a communication satellite 108, e.g. a communication beam providing an active communication link. In some examples the antenna 102 may be operable to generate only a single beam at any one instance. In other examples the satellite antenna 102 may be a multiple beam satellite antenna 102, for instance operable to generate a first beam (communication beam) for communicating with a first communications satellite 108, and to simultaneously generate a second beam (search beam) for searching for one or more further communication satellites 108. A further option is that the satellite antenna 108 operates on a time slicing basis to generate different beams (e.g., a search beam and a communication beam) at different times.

FIG. 1 illustrates a plurality of available communication satellites 108 each of which are transmitting signals that may be received by the satellite terminal 100 using one of beams 110 (which may be simultaneously or sequentially generated). FIG. 1 also illustrates a further communication satellite 108' that is within the field of view of the satellite antenna 102 of the satellite terminal 100, but with which the satellite terminal is not able to communicate, for example not having a commercial relationship between the operator of the satellite terminal 100 and an operator of the communication satellite 108', or being geographically located outside of the beam of the communication satellite 108'. The communication satellites 108 may be arranged in different orbits, for instance a geostationary orbit (GEO) 112, a medium Earth orbit (MEO) 114 and a low Earth orbit (LEO) 116. The satellite terminal 100 may be suitably configured to communicate with some or all of the available communication satellites 108 in one or more of the illustrated orbits. Similarly, the satellite terminal 100 may be configured to communicate with communication satellites 108 in one or more available satellite communication band. Where examples of the present disclosure make reference to searching for and locating communication satellites 108, it is not necessary that the satellite terminal 100 is able to locate all communication satellites 108 within the field of view of the satellite antenna 102. The skilled person will be familiar with the construction and operation of a satellite terminal and operation of a satellite communication network, and so a full explanation of a suitable satellite terminal 100 will not be provided here.

Turning now to FIG. 2, a method of operating the satellite terminal 100 of FIG. 1 will now be described for searching for and locating communication satellites 108. Two different processes may operate in tandem, as illustrated, or a satellite terminal 100 may only implement one process. Further, the processes may be performed simultaneously or at different times. Regarding the first process, at step 200 the processor 104 controls antenna 102 to generate at least one beam 110 (search beam) operable to scan at least a portion of the field of view of the satellite antenna 102. In some examples multiple beams 110 (search beams) may be generated in order to speed the search. The whole field of view of the antenna 102 may be searched or the searched portion may be predefined or dynamically determined. Any suitable search pattern may be deployed. The skilled person will appreciate that the search technique may be dependent on the properties of the generated beam 110 (not least the beam width) of the satellite antenna 102 and the type and orbit of communication satellites 108 that are searched for.

At step 202 the satellite antenna 102 may receive through beam 110 one or more signals originating from a communication satellite 108. It will be appreciated that the determination of whether a received signal originates from a communication satellite 108 may be dependent on the properties of the signal (for instance frequency band) and/or information content of the signal. If a signal is received from a communication satellite 108, this is used to locate the communication satellite 108. The location of the communication satellite may comprise a direction from which the signal is received (that is the direction the beam 110 is pointing at the time), for instance in terms of altitude (or elevation) and azimuth. Other ways of defining the location of a communication satellite will be well known to the skilled person.

In some examples the search performed at steps 200 and 202 may comprise the satellite antenna 102 being controlled to first produce a broad beam (broader search beam) for performing an initial search and then when a communication satellite 108 is detected, being controlled to narrow the beam (narrower search beam) to tighten the search and provide a more exact location for the communication satellite 108. Advantageously, by first using a broad beam of the satellite antenna 102 an initial search may be performed more quickly to yield an initial overview of available communication satellites and their approximate locations. The beam of the satellite antenna 102 may then be narrowed either progressively or in steps, either continuously or discretely, to tighten the search around approximate locations of communication satellites. Suitable search techniques will be apparent to the skilled person.

At step 204 the method further comprises updating a satellite terminal database with the location of the located communication satellite 108. The satellite terminal database may suitably be stored in memory 106, or it may be stored in any other suitable storage device associated with the satellite terminal, including being stored in a remote network location (e.g. being stored in a memory of a network controller). The term "satellite terminal database" should not be interpreted as imposing any specific requirements or data formatting on the information stored. In the database individual entries for communication satellites may be given arbitrary identifiers or may be identified using information obtained from a received signal and stored in association with the determined satellite location.

Separately, at step 206 the second process makes use of satellite ephemeris data including a predicted location for at least one communication satellite 108. The satellite ephemeris data may be publicly available or may be available only for a satellite terminal operator having a commercial relationship with an operator of a given constellation of satellites. The satellite ephemeris data may be obtained in advance or may be broadcast by one or more satellite and downloaded on demand by the satellite terminal 100. Using the predicted location of a communication satellite, the processor 104 controls the satellite antenna 102 to generate at least one beam 110 (directed search beam) operable to perform a search in the vicinity of the predicted location in the field of view of the satellite antenna 102. That is, a directed, focused search may be performed as opposed to the free search described above in connection with step 200. That a search remains necessary at all, given the predicted location of the communication satellite, may arise from inaccurate satellite location information (or information that is subject to change, for satellite orbits that may change over time) together with possibly inaccurate information concerning the geographical location and orientation of the satellite antenna 102.

At step 208, the searched for communication satellite 108 is located. That it is the satellite that was searched for that is located may be ascertained by inspecting the contents of the received signal. Of course, should a further communication satellite be located during the directed search, then the location for the further communication satellite may also be determined. A location for a communication satellite 108 may then be recorded in the satellite terminal database as described above for step 204. The identification of specific communication satellites 108 may be based upon the location of the communication satellite. The identification of specific communication satellites 108 may additionally or alternatively be based upon one or both of the beam pattern of the communication satellite (and corresponding beam footprint upon the ground), and the communication frequency bands of the communication satellite.

As for the search of the first process, the search and location of satellites at steps 206 and 208 may also commence with a broad beam (broader directed search beam) of the satellite antenna 102 which is then narrowed progressively or in steps, continuously or discretely (narrower directed search beam). However, depending upon the accuracy of the predicted locations of communications satellites, this may not be necessary.

Accordingly, through either or both processes described in connection with FIG. 2, in accordance with an example of the present disclosure the satellite terminal 100 is configured to build up a picture of available communication satellites in the field of view of its satellite antenna 102. As noted previously, this picture may not be comprehensive, but at least represents more reliable and up to date information concerning satellite locations that may feed into later routing decisions, as is described below.

Searching for and locating communication satellites 108 may be performed continuously or periodically. For instance, for a multiple beam satellite antenna, beams that are not currently in use for an active communication link may be used at least part of the time for updating the information held in the satellite terminal database concerning available satellites (one or more beams, when not in use as communication beams, may be used as search beams).

Where satellite ephemeris data is available to the satellite terminal 100, for instance previously having been obtained and used to perform the directed search of step 206, this data may also be used to extract information indicating how secure or trusted a communication satellite is. In some examples, satellite ephemeris data may be obtained through a signal received from a located satellite (for instance one located through the free search of step 200). This security or trust information may be stored in the satellite terminal database as information characterising a located communication satellite. For instance, the satellite ephemeris data may indicate an operator of the satellite, parameters concerning the communications transmitted to or from the satellite (for instance, beam pattern, frequency, coding or encryption), all of which may inform the degree to which the satellite terminal 100 (or its operator) may trust the communication satellite. Further examples of information characterising a located communication satellite, including those based on a signal received from the satellite, are given below.

The satellite terminal 100 may be further configured to determine at least one of a location of the satellite antenna 102 and an orientation of the satellite antenna 102 at the time of locating a communication satellite 108. In some examples one or both pieces of information may be continuously or periodically updated. Location for the satellite antenna 102 may comprise a geographic location (e.g. location on earth), for instance determined using an onboard receiver for a Global Navigation Satellite System (GNSS) such as the Global Positioning System (GPS). Other techniques for determining a location of the satellite antenna 102, for instance terrestrial positioning systems and inertial measurement units, will be well known to the skilled person. The present applicant's earlier international patent application WO-2021/140451-A1, the full disclosure of which is hereby incorporated by reference, provides a further example whereby a satellite terminal may determine its own position using signals received from communication satellites and satellite ephemeris data. Examples of the present disclosure are not restricted to any particular location determination technique, nor indeed any particular location format. The location of a satellite antenna 102 may further include an altitude of the satellite antenna 102 above sea level (especially for airborne satellite terminals 100). The orientation of the satellite antenna 102 may be determined through any suitable technique, for instance through the use of onboard motion sensors such as accelerometers.

The current location of the satellite antenna 102 or the orientation of the satellite antenna 102 may be recorded in the satellite terminal database in association with the location of a located communication satellite 108. Additionally, or instead, the time at which a location for a communication satellite 108 is determined may be recorded in the satellite terminal database. In this way, a model may be built up in the satellite terminal database indicating those communication satellites 108 that are available to the satellite terminal 100 across a geographic area.

For the directed search technique described above in connection with step 206, information concerning the current location of the satellite terminal 100 and/or orientation of the antenna 102 may be used to extract from the satellite ephemeris data a predicted location for a first communication satellite that is expected to be visible within the current field of view of the antenna 102 for a current location or orientation of the satellite antenna (e.g. for which the satellite antenna 102 is within the beam of the communication satellite). In this way, a reduced data set of predicted communication satellite locations may be obtained and used to instruct the search in the vicinity of one or more of those predicted locations. As noted previously, as well as the directed search either the same or a further beam of the antenna 102 may be used to scan a wider portion of the field of view of the satellite antenna 102 to locate communication satellites 108. As an example, a broader search may be performed while steering the beam from one predicted satellite location to another or in between searching predicted locations (or after all predicted locations have been checked). In some examples at least one beam may be dedicated to performing the directed search of step 206 and one beam may be dedicated to performing the free search of step 200.

Figure 3:
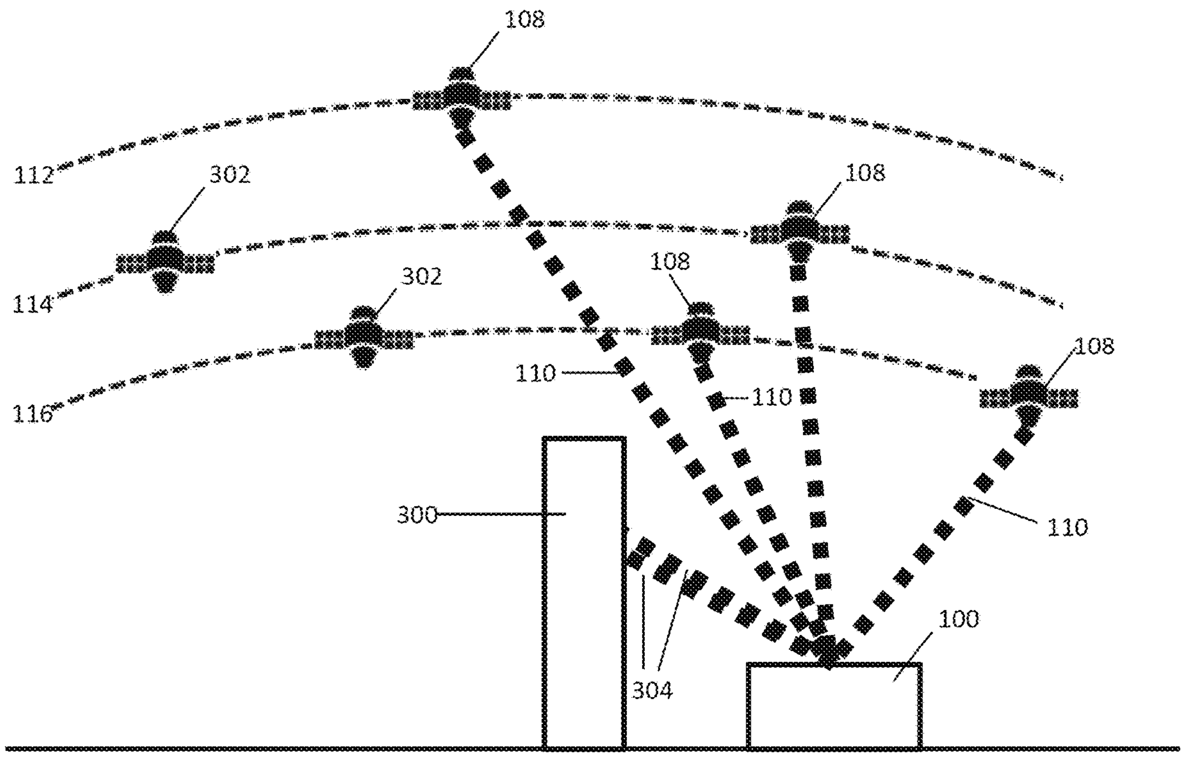
FIG. 3 is a schematic illustration of a satellite terminal operating in accordance with a further example of the present disclosure to determine signal blocking.

Referring now to FIG. 3 it will be appreciated that for some geographic locations of a satellite terminal 100, and for some orientations of the satellite antenna 102, a portion of the field of view of the antenna 102 may be blocked. FIG. 3 gives the example of a building 300 blocking two particular communication satellites 302 that would otherwise be visible to satellite terminal 100. That is, when beams 304 are directed towards the predicted locations of satellites 302, no signal is received. For example, a search beam is directed towards predicted locations of satellites to determine blockage or availability of the satellites, whilst a communication beam may provide a communication link, simultaneously or on a time slicing basis with the search beam, enabling assessment of whether communication satellites or a portion of the field of view of the antenna (or both) is blocked or visible without breaking the communication link. Understanding which portions of the field of view of the satellite antenna 102 are blocked in a particular location, or which particular satellites 302 are blocked, may be used to inform decisions made by either the satellite terminal 100 or the satellite communications network (e.g. by a network controller). Similarly, understanding which portion of the field of view of the satellite antenna 102 is not blocked (e.g. available for communication with communication satellites 108), or which particular satellites 302 are visible to the satellite antenna 102 may be used to inform decisions made by either the satellite terminal 100 or the satellite communications network (e.g. by a network controller). The satellite terminal 100 can share such a blockage model with other satellite terminals or with the satellite communication network, enabling pre-emptive action when a further satellite terminal (e.g., the satellite antenna of the further satellite terminal) is subsequently present at the same location.

In accordance with an example of the present disclosure, where satellite ephemeris data is available to the satellite terminal 100 and used to performed directed searches at step 206 (with a directed search beam), this may further be used to determine satellites that should be visible but are not visible, from which it can be inferred that those satellites are blocked. Specifically, in some examples of the present disclosure the satellite terminal 100 is configured to compare predicted locations of communication satellites 108 from the satellite ephemeris data for a current location of the satellite antenna 102 and locations of communication satellites in the satellite terminal database to determine satellites that should be within the database and which have not been located. In other examples, the determination of satellites that are blocked may be made without reference to the database by searching (e.g. with a search beam) in the vicinity of predicted satellite locations and noting those that are not visible. From this there may be obtained a list of communication satellites which are blocked at the current location of the satellite terminal 100 (and for a current orientation of the antenna 102). Additionally, or alternatively, a determination of blocked satellites may be used to infer a portion of the field of view of the satellite antenna 102 which is blocked at the current location of the satellite terminal 100. A single determined portion of field of view may encompass all of the satellites 302 determined to be blocked or multiple portions of the field of view may be determined to be blocked. As an example it may be determined that the portion of sky below 20° of elevation extending from north through to west of the current satellite terminal 100 is blocked. Similarly, a determination of satellites that are not blocked may be used to infer a portion of the field of view of the satellite antenna 102 that is not blocked.

Information concerning blocked satellites, blocked portions of the field of view of the satellite antenna 102, or both, at a particular geographic location of the satellite antenna, may be stored in the satellite terminal database. (Similarly, information concerning available satellites, available portions of the field of view of the satellite antenna 102, or both, at a particular geographic location of the satellite antenna, may be stored in the satellite terminal database.) Accordingly, the satellite terminal 100 may build up a model of blocked satellites or blocked portions for the field of view for previous geographic locations, along with the current location. Where a satellite terminal 100 is mounted on a vehicle traversing a regular route, this information may be used to infer that the same satellites or portions for the field of view will again be blocked when the satellite terminal 100 returns to the same location. Similarly, information concerning communication satellites that are visible to the satellite antenna or a visible portion of the field of view of the satellite antenna at a particular geographic location of the satellite antenna may be stored in the satellite terminal database, and the satellite terminal 100 may build up a model of visible satellites or the visible field of view for previous geographic locations, along with the current location. Models of satellites or portions of the field of view that are blocked or visible and associated locations may be shared with another satellite terminal, a satellite communication network (e.g. received by a network entity), or both.

Figure 4:
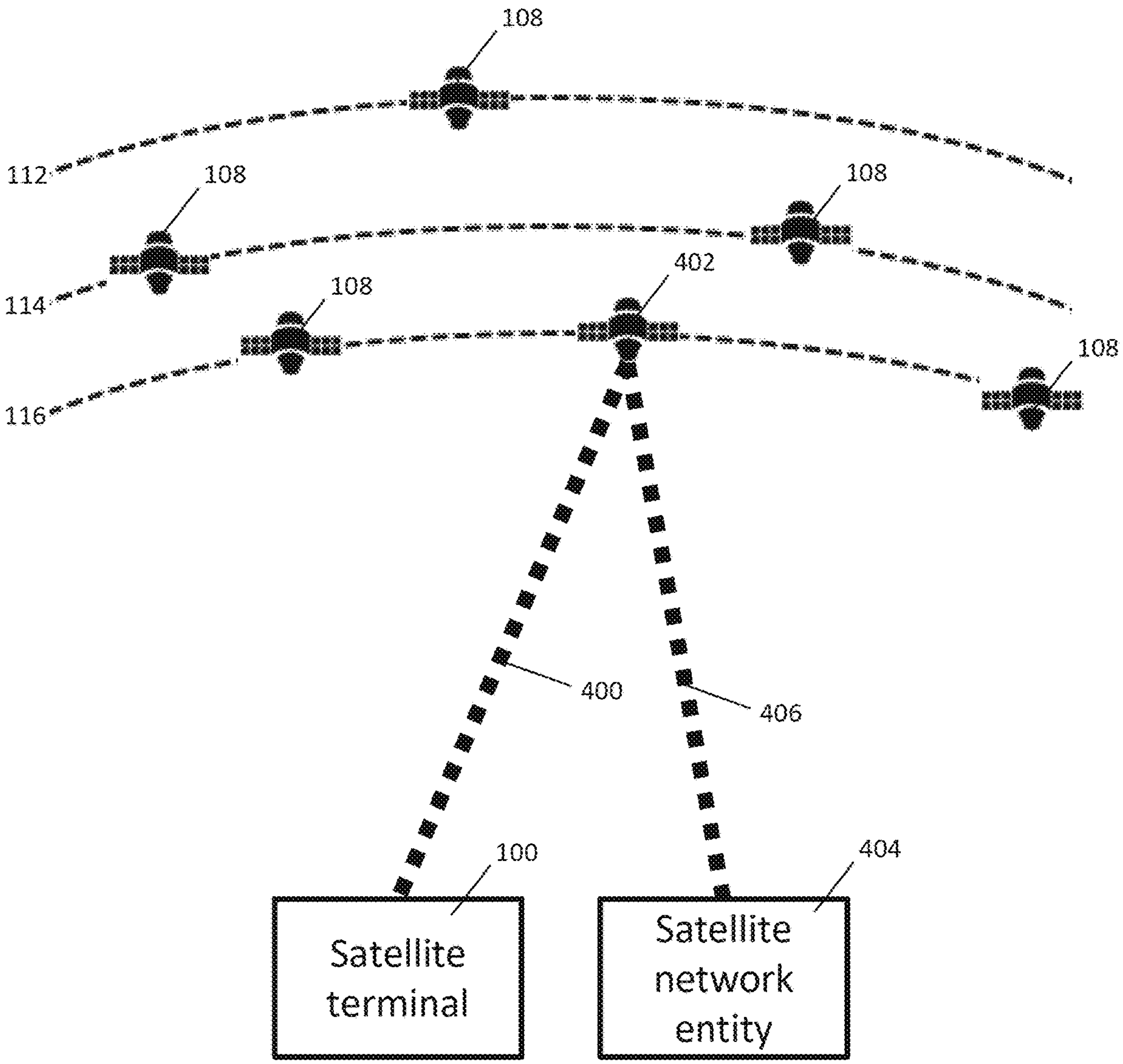
FIG. 4 is a schematic illustration of a satellite communication system comprising a satellite terminal, at least one communication satellite and a satellite network element, the system operating in accordance with a further example of the present disclosure.

Referring now to FIG. 4, in certain examples of the present disclosure the satellite terminal 100 may be configured to transmit a message to a satellite communication network (e.g. to a network controller) or to a further satellite terminal 100, the message indicating a list of communication satellites 302 which are blocked (or visible) or a portion of the field of view of the satellite antenna 102 which is blocked (or visible) at a current location of the satellite terminal. Additionally, or alternatively, it need not be real time blocking information (or visibility information) that is transmitted: information concerning blocking (or visibility) for previous geographic locations of the satellite antenna 102 may be periodically transferred from the satellite terminal database. The message may be transferred to a further satellite terminal 100 through any suitable mechanism, including a terrestrial communication network, if one is available, or through a satellite communication network. The recipient satellite terminal 100 may use the received information to learn which satellites might be blocked (or visible) at certain geographic locations. This may replace or supplement any locally derived blocking information (or visibility information). Similarly, the satellite terminal 100 may receive corresponding data on the blockage or visibility of satellites or portions of the field of view (or both) at particular geographic locations of a satellite antenna 102.

Similarly, part or the whole of the blocking information (or visibility information) stored in the satellite terminal 100 (in some examples, the satellite terminal database) may be transmitted to the satellite communication network in any suitable manner. FIG. 4 gives an example in which the satellite terminal 100 communicates through beam 400 with a first communication satellite 402, which relays the information to a satellite network entity 404 (e.g. to a network controller) through beam 406. Satellite network entity 404 may in some examples be a terrestrial node of the satellite communication network, or in some examples may be a satellite itself.

An alternative approach to determining blocked satellites or a blocked portion of the field of view is to provide information concerning visible satellites at a particular satellite terminal geographic location to a network entity. The network entity may then compare the visible satellites with satellites expected to be visible from ephemeris data to determining a list of blocked satellites or a blocked portion of the field of view. This may be desirable over the technique for determining blocking described above by reducing the processing required to be performed at the satellite terminal and also removing the requirement for the satellite terminal to be in possession of satellite ephemeris data giving predicted satellite locations.

Figure 5:
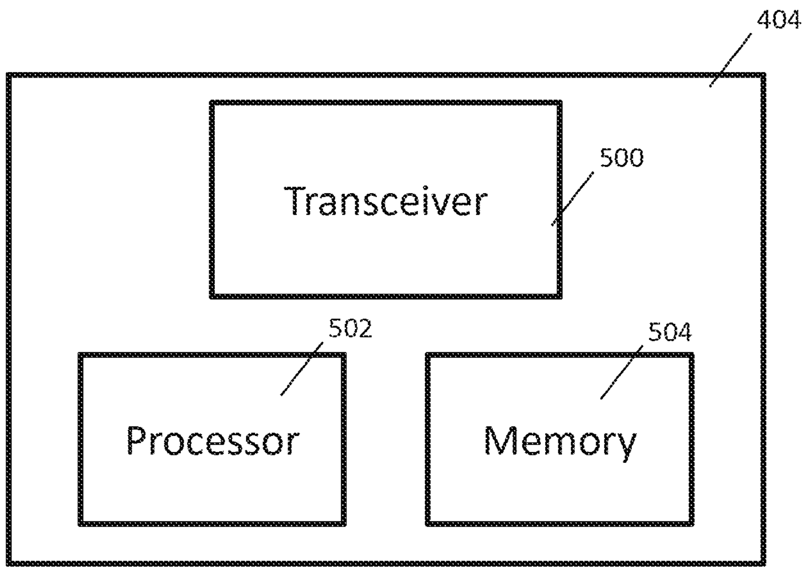
FIG. 5 is a schematic illustration of a satellite communication network entity operating in accordance with an example of the present disclosure.

Referring to FIG. 5, the satellite communications network entity (network element) 404 (e.g. a network controller) in some examples comprises a transceiver 500, a processor 502 and a memory 504 storing executable instructions that, in response to execution by the processor 502, cause the processor to perform the method described below in connection FIG. 6. In particular, the processor 502 controls the transceiver 500 to communicate with satellite terminal 100. The satellite terminal 100 and the satellite communication network entity 404 may be collectively referred to as a satellite communications system. It will be appreciated that the system may comprise further components, not least of which are the communication satellites 108 themselves.

Figure 6:
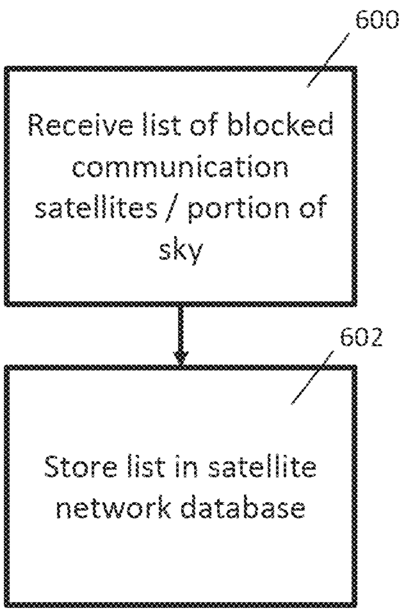
FIG. 6 is a flowchart illustrating a method of operating a satellite communication network entity in accordance with an example of the present disclosure.

Referring to FIG. 6, a method of operating a satellite communications network entity 404 according to an example of the present disclosure will now be described. At step 600 the network entity 404 receives from the satellite terminal 100 a message indicating a list of communication satellites 108 which are blocked or a portion of the field of view of the satellite antenna 102 which is blocked at a particular geographic location (which may be the current location of the satellite terminal). At step 602 the network entity stores the message contents in a satellite network database, which may for instance be stored in memory 504 of the network entity 404. Similarly, the network entity 404 may receive from the satellite terminal 100, and store, a message indicating a list of communication satellites 108 which are visible to the satellite antenna or a visible portion of the field of view of the satellite antenna at a particular geographic location of the satellite antenna. Information concerning blocked (or visible) satellites or blocked (or visible) portions of the sky may be received only once or periodically from a satellite terminal 100. Furthermore, the network entity 404 may receive this information from a plurality of satellite terminals 100 either directly or where a first terminal 100 has previously received blocking information (or visibility information) from a second terminal 100.

The network entity 404 in some examples of the present disclosure uses this information from satellite terminals indicating communication satellites which are blocked (or are visible) or portions of the field of view of a satellite antenna which are blocked (or visible) at different locations to build a model of satellite communications network availability across a geographical area. That is, the network entity 404 builds up a model of satellites or portions of the sky including satellites that would otherwise be expected to be available to a satellite terminal at different geographic locations, but prove in fact to not be available, for example due to the presence at that location of tall buildings or blocking terrain. In some examples of the present disclosure the network entity may make use of this model to select a communications satellite for communication with a satellite terminal according to a known location of the satellite antenna of that satellite terminal. That is, where a geographic location of the satellite antenna is known (for instance, having been previously communicated to the satellite communications network), in selecting a suitable satellite 108 for communicating with the satellite terminal 100, knowledge of satellites that are not in fact available to the satellite terminal may be used in the selection, in addition to other parameters such as relative satellite loading.

In a specific example, a satellite communications network entity 404 may determine that there is a need to handover an active satellite communications link with a satellite terminal from a first communication satellite, for instance because the first communication satellite is a MEO or LEO satellite and it is about to disappear outside of the expected field of view of an antenna at the satellite terminal. In determining a second communication satellite to instruct the terminal to handover to, the network entity may discount any communication satellite known to be blocked for the current geographic location of the satellite antenna of the satellite terminal (or select a communication satellite known to be visible to the satellite antenna). Additionally, the network element may further discount any communication satellite that is shortly to pass into a portion of the field of view of the satellite antenna of the satellite terminal that is blocked (or may select a communication satellite that is passing a portion of the field of view of the satellite antenna that is visible).

In a further example, the satellite communication network may be communicating with a satellite terminal via a first communication satellite in the network. The network element 404 may receive from the satellite terminal 100 a message requesting handover to an alternative communication satellite or a message indicating a portion of the field of view of a satellite antenna of the satellite terminal which is blocked (or visible) at a current location of the satellite terminal. The network entity may then instruct a handover of communications from the first communication satellite to a second communication satellite on the basis of the received message and the contents of the satellite network database. That is, the information on blocking (or visibility) may be used in real time in response to a request from the satellite terminal for a handover.

Referring back to processes performed at the satellite terminal 100, the satellite terminal 100 may be further configured to control a beam 110 of the satellite antenna 102 (e.g., control a search beam, which may operate simultaneously or on a time slicing basis with a communications beam) to recursively relocate previously located communications satellites 108. That is, the beam 110 may be used to perform a search based on a location of a first communication satellite 108 in the satellite terminal database. In this way an updated location for the first communication satellite 108 may be determined and the location of the first communication satellite 108 in the satellite terminal database may be updated. This location updating may be performed at predetermined intervals or as and when satellite antenna capacity allows.

Furthermore, for a communication satellite 108 for which locations have been determined at first and second points in time, the satellite terminal 100, particularly the processor 104 may estimate a trajectory of the communication satellite 108 based on the pair of known locations. The estimated trajectory may be further recorded in the database. It may further be used to predict a location of the communication satellite 108 at a third time point.

In addition to determining the location of an available communication satellite, the satellite terminal 100 may use a signal received from the communication satellite through a beam of the satellite antenna to determine further information characterising the communication satellite. This characterising information may also be recorded in the satellite terminal, and optionally reported to a network element (e.g. reported to a network controller). For instance, the received signal may be used to identify the communication satellite. For instance, the signal transmitted by a satellite may directly include its identify, or its identity may be inferred from the information content and/or satellite ephemeris data. Further, the communication satellite may be identified (e.g. by a network controller) using information about the beam pattern of the communication satellite, from satellite terminals with satellite antennae at different geographical locations (e.g. from geographical locations inside and outside the beam pattern of the communication satellite). Furthermore, the satellite terminal may use the received signal to determine a signal strength for the communication satellite. Furthermore, the satellite terminal may use the received signal to determine a signal latency for the communication satellite. Identity, signal strength and/or signal latency may be recorded in the satellite terminal database (or in a satellite network database) in association with satellite location information, and optionally other factors discussed previously (such as satellite antenna location, satellite antenna orientation, trust and security determinations).

The determination of signal latency for the communication satellite using a received signal from a satellite may be based on timing information contained within the received signal. It may further take account of satellite ephemeris data, for instance the known orbit or satellite type.

In a further example the satellite terminal may be configured to determine an estimate of uplink or downlink bandwidth throughput for a communication satellite. This may be based on measured signal strength and information in the satellite ephemeris data concerning orbit or type of satellite. Estimated uplink or downlink bandwidth may also be stored in the satellite terminal database (or satellite network database) as information characterising the communication satellite.

Figure 7:
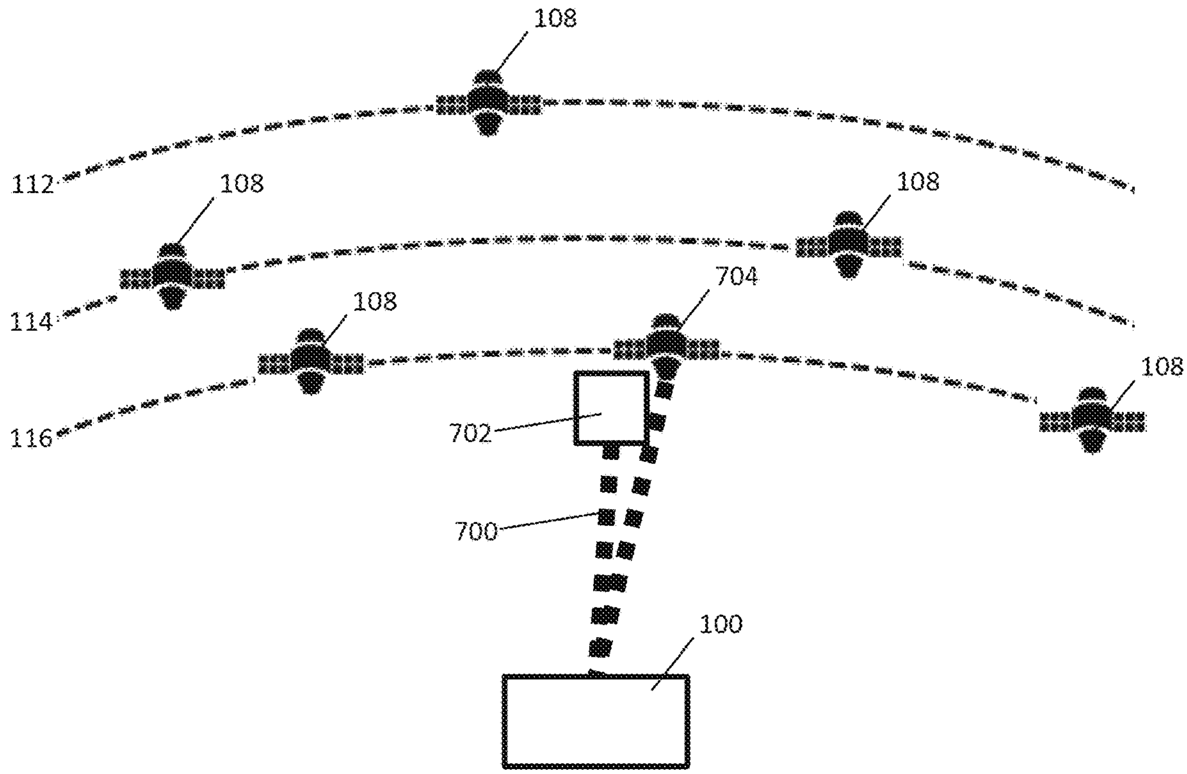
FIG. 7 is a schematic illustration of a satellite terminal operating in accordance with a yet further example of the present disclosure to determine signal interference.

Referring now to FIG. 7, in a further example of the present disclosure in addition to locating available satellites the satellite terminal may be further configured to control a beam of the satellite antenna (e.g., control a search beam) to detect an interference signal that could interfere with communication between the satellite antenna 102 and a communication satellite in the satellite terminal database. For instance, the satellite terminal 100 may detect the presence of an interference signal 700 from interference source 702 that arrives from a direction close to the location of a first communication satellite 704. A signal may be determined to be an interference signal on the basis of range of factors, including whether it is in the same frequency band as a desired signal, whether the signal is received from close to the location of the desired signal and the relative strengths of the interference signal and the desired signal. The satellite terminal database (or satellite network database) may be updated with information about the interference signal.

Furthermore, according to certain examples, a satellite terminal may be further configured to determine directions for an interference signal for two or more geographical locations of a satellite antenna of the satellite terminal and from this information to determine the location of the interference source. The satellite terminal database (or satellite network database) may be updated with the location of the interference signal. Knowledge of interference signals affecting one or more communication satellites in a particular location for the terminal may be used in routing decisions made either by the terminal or by the network controller (if interference data is fed back to the network). For instance, handover to a satellite which is currently affected by interference may be avoided.

Examples of the use of blocking information by a satellite communication network entity to inform communication routing decisions have been presented above. Specifically, the network controller may make use of information concerning signal blocking to generate a model of signal blocking across a geographic area, and use the model of signal blocking to inform routing decisions. It will be appreciated that the satellite terminal may itself make use of signal blocking information and also or alternatively information contained within the satellite terminal database, as will now be described.

As a first example, a satellite terminal may be configured to control the satellite antenna to generate a first beam (e.g., a first communication beam) to communicate with a first communication satellite. The satellite terminal may subsequently determine to connect to an alternative communication satellite. This determination may be made upon interruption of communication with the first satellite. Alternatively, a proactive determination to connect to a different communication satellite may be made in advance of signal interruption. As an example, blocking information stored at the satellite terminal may indicate likely interruption to the ongoing communication. A connection to a new satellite may be made in advance (a make before break connection). The new satellite may be part of the same satellite communications network as the first satellite, or it may form part of a separate communication network.

More generally, a satellite terminal may determine to connect to a new communication satellite (either to replace an existing connection or to establish a new network connection) on the basis of one or more of blocking information, information characterising the first communication satellite, information in the satellite terminal database characterising an alternative communication satellite and a change in type of communication traffic to be transmitted to a satellite communication network. As an example of the latter, an existing satellite connection may be to a GEO satellite for the reception of broadcast satellite television. The user of the satellite terminal may request that a telephone or video call connection be made. The satellite terminal may determine that a satellite connection with a lower latency is required for this and select a new satellite to connect to on the basis of latency information held within the satellite terminal database. The satellite terminal is then configured to control the satellite antenna to generate a beam to communicate with the selected communication satellite. It will be appreciated that in some examples, especially for multiple beam satellite antennas, new satellite connections may be made in addition to rather than in place of existing connections.

In a further mode of operation, a satellite terminal may be configured to control the satellite antenna to generate a beam (e.g., a first communication beam) to communicate with a first communication satellite. A signal may be received from the first communication satellite instructing a handover of communications from the first communication satellite to a second communication satellite. The satellite terminal may then determine how to proceed on the basis of locally stored information in the satellite terminal database. For instance, the satellite terminal might identify a current location for the second communication satellite using the satellite terminal database and use the current location for the second communication satellite to steer a beam of the satellite antenna (e.g., a second communication beam) to the current location for the second communication satellite in preparation for handover. Advantageously, this permits faster signal acquisition for the second communication satellite. Alternatively, the satellite terminal might transmit a message to the first communication satellite requesting handover instead to an alternative communication satellite in the satellite terminal database.

In a further mode of operation, a satellite terminal may control the satellite antenna to generate a beam to communicate with a first communication satellite. Subsequently, the satellite antenna may determine to connect to an alternative communication satellite on the basis of one of information characterising the first communication satellite, information in the satellite terminal database characterising an alternative communication satellite, a change in type of communication traffic to be transmitted to a satellite communication network. The satellite terminal may then transmit a message to a satellite communication network requesting a handover to an alternative communication satellite recorded in the satellite terminal database.

As noted previously, the satellite terminal may determine a broad range of information characterising a communication satellite which it has located in its field of view. Some or all of this information may be communicated to a satellite communication network or to a further satellite terminal. Where this information is transmitted to a satellite communication network entity (e.g. to a network controller), for instance where information including one or more of a location of the communication satellite, an identity of the communication satellite, a signal strength, a latency measurement, a link reliability estimate, a network congestion estimate, a bandwidth availability estimate (e.g. one or both of uplink and downlink bandwidth), a link frequency measurement, and an interference signal is transmitted to a network entity, the network entity may store that information in a satellite network database. The link frequency measurement may enable more rapid link reacquisition.

The methods of operating a satellite terminal described above are not restricted to any specific hardware implementation beyond a requirement to be able to generate at least one beam for communicating with a communication satellite (at least, receiving a signal from the satellite). In some examples, the satellite antenna may be a multiple beam satellite antenna configured to generate at least two beams simultaneously (e.g., a search beam and at least one communication beam; or two communication beams). In particular, in some examples a first beam may be generated for communicating with a first communication satellite while at least one second beam is generated (at least part of the time) for searching for available communication satellites. Alternatively or additionally the satellite antenna may be configured to generate at least two beams in separate time periods (on a time slicing basis). For instance, while communicating with a first communication satellite using a first beam, in gaps between packets transmitted to or received from the first communication satellite a second beam may be generated for searching for available communication satellites. This may be referred to as time slicing.

In some examples the satellite antenna is one of a Very Small Aperture Terminal (VSAT) antenna, a phased array and a lens antenna array. In particular, a lens antenna array is a type of phased array antenna and may comprise a plurality of lens sets, each lens set including a lens and a plurality of feed elements aligned with the lens and each configured to direct a signal through the lens in different desired directions. Controlling the feed elements for the plurality of lens sets enables the control of at least two separate beams. A lens array antenna may comprise a relatively small number of elements and components compared with a conventional phased array, particularly a relatively small number of radiating elements each of which is relatively electrically large, for instance a 5 wavelengths Gradient Index (GRIN) lens, optimised with multiple feed elements in its focal region. The set of lens-feeds may produce multiple beams operable to span the desired beam steering range or field of view. A full description of a suitable lens antenna array is provided in the present applicant's earlier European patent application EP-3376595-A1, the full disclosure of which is hereby incorporated by reference.

It will be appreciated that examples of the present disclosure can be realized in the form of hardware, software or a combination of hardware and software. Any such software may be stored in the form of volatile or non-volatile storage, for example a storage device like a ROM, whether erasable or rewritable or not, or in the form of memory, for example RAM, memory chips, device or integrated circuits or on an optically or magnetically readable medium, for example a CD, DVD, magnetic disk or magnetic tape or the like. It will be appreciated that the storage devices and storage media are examples of machine-readable storage that are suitable for storing a program or programs comprising instructions that, when executed, implement examples of the present disclosure.

Accordingly, examples provide a program comprising code for implementing apparatus or a method as claimed in any one of the claims of this specification and a machine-readable storage storing such a program. Still further, such programs may be conveyed electronically via any medium, for example a communication signal carried over a wired or wireless connection and examples suitably encompass the same.

Throughout this specification, the words "comprise" and "contain" and variations of them mean "including but not limited to", and they are not intended to (and do not) exclude other components, integers or steps. Throughout this specification, the singular encompasses the plural unless the context otherwise requires. In particular, where the indefinite article is used, the specification is to be understood as contemplating plurality as well as singularity, unless the context requires otherwise. Throughout this specification, the term "about" is used to provide flexibility to a range endpoint by providing that a given value may be "a little above" or "a little below" the endpoint. The degree of flexibility of this term can be dictated by the particular variable and can be determined based on experience and the associated description herein.

Features, integers or characteristics described in conjunction with a particular aspect or example of the invention are to be understood to be applicable to any other aspect or example described herein unless incompatible therewith. All of the features disclosed in this specification, and/or all of the steps of any method or process so disclosed, may be combined in any combination, except combinations where at least some of such features and/or steps are mutually exclusive. The invention is not restricted to the details of any foregoing examples. The invention extends to any novel feature or combination of features disclosed in this specification. It will be also be appreciated that, throughout this specification, language in the general form of "X for Y" (where Y is some action, activity or step and X is some means for carrying out that action, activity or step) encompasses means X adapted or arranged specifically, but not exclusively, to do Y.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of operating a satellite communications network, the method comprising:

receiving from a satellite terminal a message;

storing contents of the message in a satellite network database, the message indicating one or both of:

(i) a list of communication satellites which are blocked to a satellite antenna or a portion of a field of view of the satellite antenna which is blocked, at a particular geographic location of the satellite antenna; and (ii) a list of communication satellites that are visible to the satellite antenna or a visible portion of the field of view of the satellite antenna, at a particular geographic location of the satellite antenna, and determining information by at least one satellite terminal generating at least two beams simultaneously, or in separate time periods on a time slicing basis, the at least two beams comprising:

a communication beam providing a communication link with a communication satellite; and a search beam for identifying one or more of:

communication satellites which are blocked at different satellite antenna locations;

portions of a field of view of a satellite antenna which are blocked at different satellite antenna locations;

communication satellites which are visible at different satellite antenna locations; and visible portions of the field of view of a satellite antenna at different satellite antenna locations.

2. A method according to claim 1, the method further comprising using the information received from satellite terminals to build a model of satellite communications network availability across a geographical area, the information indicating one or more of:

the communication satellites which are blocked at different satellite antenna locations;

the portions of the field of view of a satellite antenna which are blocked at different satellite antenna locations;

the communication satellites which are visible at different satellite antenna locations; and the visible portions of the field of view of a satellite antenna at different satellite antenna locations.

3. A method according to claim 2, the method further comprising:

using the model to select a communications satellite for communication with a satellite terminal according to a known location of the satellite antenna of that satellite terminal.

4. A method according to claim 1, the method further comprising:

receiving from a satellite terminal a message including, for a geographic location of the satellite antenna, information characterising at least one communication satellite, the information including at least one of:

a location of the communication satellite;

an identity of the communication satellite;

a signal strength;

a latency estimate;

a link reliability estimate;

a network congestion estimate;

a bandwidth availability estimate;

a link frequency measurement; and an interference signal; and storing the characterising information in the satellite network database.

5. A method according to claim 1, the method further comprising:

communicating with a satellite terminal via a first communication satellite in the network;

receiving from the satellite terminal a message requesting handover to an alternative communication satellite or a message indicating a portion of the field of view of a satellite antenna of the satellite terminal which is blocked at a current location of the satellite antenna; and instructing a handover of communications from the first communication satellite to a second communication satellite on the basis of the received message and the contents of the satellite network database.

6. A method of operating a satellite terminal having a satellite antenna, the method comprising:

generating at least two beams simultaneously or in separate time periods on a time slicing basis, comprising:

controlling a first beam of the satellite antenna to scan at least a portion of a field of view of the satellite antenna and locate and establish a communication link with at least one communication satellite; and controlling a second beam of the satellite antenna to perform a search to locate a communication satellite in a vicinity of a predicted location of the communication satellite, the predicted location being obtained from satellite ephemeris data; and the method further comprising updating a satellite terminal database of communication satellites and their locations by recording the location of the located communication satellite in the satellite terminal database.

7. A method according to claim 6, wherein the step of controlling the beam of the satellite antenna comprises producing a broader first beam for performing an initial search, and then when a communication satellite is detected, producing a narrower second beam for performing a second search.

8. A method according to claim 6, the method further comprising:

extracting, from the satellite ephemeris data, information indicating how secure or trusted a communication satellite is, and storing this information in the satellite terminal database as information characterising a located communication satellite.

9. A method according to claim 6, the method further comprising:

determining at least one of a current location of the satellite antenna and an orientation of the satellite antenna at the time of locating a communication satellite; and recording the current location of the satellite antenna or the orientation of the satellite antenna in the satellite terminal database in association with the location of the communication satellite.

10. A method according to claim 9, wherein the step of controlling a beam of the satellite antenna to perform a search to locate a communication satellite in the vicinity of a predicted location of the communication satellite further comprises:

determining from the satellite ephemeris data a predicted location for a first communication satellite for a current location or orientation of the satellite antenna.

11. A method according to claim 9, the method further comprising:

controlling a beam of the satellite antenna to scan at least a portion of the field of view of the satellite antenna to locate communication satellites in addition to using the predicted location of the first communication satellite.

12. A method according to claim 9, the method further comprising:

comparing predicted locations of communication satellites from the satellite ephemeris data for a current location of the satellite antenna and locations of communication satellites in the satellite terminal database; and determining based on the comparison at least one of:

a list of communication satellites which are blocked at the current location of the satellite antenna; and a portion of the field of view of the satellite antenna which is blocked at the current location of the satellite antenna.

13. A method according to claim 12, the method further comprising transmitting a message to a satellite communication network or to a further satellite terminal, the message indicating a list of communication satellites which are blocked or a portion of the field of view of the satellite antenna which is blocked at a particular geographic location of the satellite antenna; or updating the satellite terminal database with the list of communication satellites which are blocked or the portion of the field of view of the satellite antenna which is blocked at a particular geographic location of the satellite antenna.

14. A method according to claim 9, the method further comprising:

comparing predicted locations of communication satellites from the satellite ephemeris data for a current location of the satellite antenna and locations of communication satellites in the satellite terminal database; and determining based on the comparison at least one of:

a list of communication satellites that are visible at the current location of the satellite antenna; and a portion of the field of view of the satellite antenna that is visible at the current location of the satellite antenna.

15. A method according to claim 14, the method further comprising transmitting a message to a satellite communication network or to a further satellite terminal, the message indicating a list of communication satellites which are visible or a portion of the field of view of the satellite antenna which is visible at a particular geographic location of the satellite antenna; or updating the satellite terminal database with the list of communication satellites which are visible or the portion of the field of view of the satellite antenna which is visible at a particular geographic location of the satellite antenna.

16. A method according to claim 6, the method further comprising:

controlling a beam of the satellite antenna to perform a search based on a location of a first communication satellite in the satellite terminal database;

determining an updated location for the first communication satellite; and updating the location of the first communication satellite in the satellite terminal database.

17. A method according to claim 16, the method further comprising:

estimating a trajectory of a communication satellite based on locations of the communication satellite at first and second time points; and using the estimated trajectory to predict a location of the communication satellite at a third time point.

18. A method according to claim 6, the method further comprising:

receiving a signal from a communication satellite through a beam of the satellite antenna;

performing at least one of:

identifying the communication satellite using the received signal;

determining a signal strength for the communication satellite using the received signal; and determining a signal latency for the communication satellite using the received signal;

and updating the satellite terminal database with information characterising the communication satellite, the information comprising at least one of:

an identity of the communication satellite;

the signal strength of the received signal; and the signal latency of the received signal.

19. The method of claim 18, wherein the determination of signal latency for the communication satellite is based on timing information contained within the received signal, or timing information contained within the received signal combined with satellite ephemeris data.

20. The method of claim 18, the method further comprising:

determining an estimate of uplink or downlink bandwidth throughput for a communication satellite based on measured signal strength and information in the satellite ephemeris data concerning orbit or type of satellite; and storing the estimated uplink or downlink bandwidth in the satellite terminal database as information characterising the communication satellite.

21. A method according to claim 6, the method further comprising:

controlling a beam of the satellite antenna to detect an interference signal that could interfere with communication between the satellite antenna and a communication satellite in the satellite terminal database; and updating the satellite terminal database with information about the interference signal.

22. A method according to claim 21, the method further comprising:

determining a received direction for an interference signal for two or more locations of the satellite antenna;

determining a location of the interference signal; and updating the satellite terminal database with the location of the interference signal.

23. A method according to claim 6, the method further comprising:

controlling the satellite antenna to generate a beam to communicate with a first communication satellite;

determining to connect to an alternative communication satellite on the basis of one of:

information characterising the first communication satellite;

information in the satellite terminal database characterising an alternative communication satellite, a satellite that is blocked to the satellite antenna, a blocked portion of the field of view of the satellite antenna, a communication satellite that is visible to the satellite antenna, or a visible portion of the field of view of the satellite antenna; and a change in type of communication traffic to be transmitted to a satellite communication network;

selecting a second communication satellite from a plurality of communication satellites recorded in the satellite terminal database on the basis of information in the satellite terminal database characterising the communication satellites; and controlling the satellite antenna to generate a beam to communicate with the second communication satellite.

24. A method according to claim 6, the method further comprising:

controlling the satellite antenna to generate a beam to communicate with a first communication satellite; and receiving from the first communication satellite a signal instructing a handover of communications from the first communication satellite to a second communication satellite;

wherein the method further comprises:

identifying a current location for the second communication satellite using the satellite terminal database and using the current location for the second communication satellite to steer a beam of the satellite antenna to the current location for the second communication satellite; or transmitting a message to the first communication satellite requesting handover instead to an alternative communication satellite in the satellite terminal database.

25. A method according to claim 6, the method further comprising:

controlling the satellite antenna to generate a beam to communicate with a first communication satellite;

determining to connect to an alternative communication satellite on the basis of one of:

information characterising the first communication satellite;

information in the satellite terminal database characterising an alternative communication satellite; and a change in type of communication traffic to be transmitted to a satellite communication network; and transmitting a message to a satellite communication network requesting a handover to an alternative communication satellite recorded in the satellite terminal database.

26. A method according to claim 6, the method further comprising transmitting a message to a satellite communication network or to a further satellite terminal, the message including at least part of the contents of the satellite terminal database.

27. A computer-readable storage device having computer-readable program code stored therein that, in response to execution by a processor, causes the processor to perform a method of operating a satellite communications network, the method comprising:

receiving from a satellite terminal a message; and storing contents of the message in a satellite network database, the message indicating one or both of:

(i) a list of communication satellites which are blocked to a satellite antenna or a portion of a field of view of the satellite antenna which is blocked, at a particular geographic location of the satellite antenna; and (ii) a list of communication satellites that are visible to the satellite antenna or a visible portion of the field of view of the satellite antenna, at a particular geographic location of the satellite antenna, and determining information by at least one satellite terminal generating at least two beams simultaneously or in separate time periods on a time slicing basis, the at least two beams comprising:

a communication beam providing a communication link with a communication satellite; and a search beam for identifying one or more of:

communication satellites which are blocked at different satellite antenna locations;

portions of a field of view of a satellite antenna which are blocked at different satellite antenna locations;

communication satellites which are visible at different satellite antenna locations; and visible portions of the field of view of a satellite antenna at different satellite antenna locations.

28. A satellite terminal comprising:

a satellite antenna;

a processor; and a memory storing executable instructions that, in response to execution by the processor, cause the processor to perform a method of operating a satellite terminal having the satellite antenna, the method comprising:

generating at least two beams simultaneously or in separate time periods on a time slicing basis, comprising:

controlling a first beam of the satellite antenna to scan at least a portion of a field of view of the satellite antenna and locate and establish a communication link with at least one communication satellite; and controlling a second beam of the satellite antenna to perform a search to locate a communication satellite in a vicinity of a predicted location of the communication satellite, the predicted location being obtained from satellite ephemeris data;

the method further comprising updating a satellite terminal database of communication satellites and their locations by recording the location of the located communication satellite in the satellite terminal database.

29. A satellite terminal according to claim 28, wherein the satellite antenna is a multiple beam satellite antenna configured to generate at least two beams simultaneously; or wherein the satellite antenna is configured to generate at least two beams in separate time periods.

30. A satellite terminal according to claim 28, wherein the satellite antenna is one of:

a VSAT antenna;

a phased array; and a lens antenna array.

31. A satellite terminal according to claim 30, wherein the lens antenna array comprises:

a plurality of lens sets, each lens set including:

a lens; and plurality of feed elements aligned with the lens and each configured to direct a signal through the lens in different desired directions;

wherein controlling the feed elements for the plurality of lens sets enables the control of at least two separate beams.

32. A satellite communications network element comprising:

a transceiver;

a processor; and a memory storing executable instructions that, in response to execution by the processor, cause the processor to perform a method of operating a satellite communications network, comprising:

receiving from a satellite terminal a message; and storing contents of the message in a satellite network database, the message indicating one or both of:

(i) a list of communication satellites which are blocked to a satellite antenna or a portion of a field of view of the satellite antenna which is blocked, at a particular geographic location of the satellite antenna; and (ii) a list of communication satellites that are visible to the satellite antenna or a visible portion of the field of view of the satellite antenna, at a particular geographic location of the satellite antenna, and determining information by at least one satellite terminal generating at least two beams simultaneously or in separate time periods on a time slicing basis, the at least two beams comprising:

a communication beam providing a communication link with a communication satellite; and a search beam for identifying the one or more of:

communication satellites which are blocked at different satellite antenna locations;

portions of a field of view of a satellite antenna which are blocked at different satellite antenna locations;

communication satellites which are visible at different satellite antenna locations; and visible portions of the field of view of a satellite antenna at different satellite antenna locations.

33. The satellite communications network element of claim 32, wherein the determining information by the at least one satellite terminal comprises generating the at least two beams simultaneously, and wherein the search beam is at least for identifying communication satellites which are visible at different satellite antenna locations.

* * * * *